United States Patent [19]

Arakawa

[11] Patent Number: 4,628,208
[45] Date of Patent: Dec. 9, 1986

[54] RADIATION IMAGE STORAGE PANEL

[75] Inventor: Satoshi Arakawa, Kaisei, Japan

[73] Assignee: Fuji Photo Film Co., Ltd., Japan

[21] Appl. No.: 542,651

[22] Filed: Oct. 17, 1983

[30] Foreign Application Priority Data

Oct. 19, 1982 [JP] Japan ............................... 57-182111

[51] Int. Cl.$^4$ .................... G01J 1/58; G01N 21/64; G01N 23/38; G01T 1/00
[52] U.S. Cl. ............................ 250/483.1; 250/327.2; 250/484.1; 250/486.1
[58] Field of Search ............... 250/483.1, 484.1, 486.1, 250/327.2

[56] References Cited

U.S. PATENT DOCUMENTS 4,259,588  3/1981  Luckey et al. ................... 250/483.1
4,380,702  4/1983  Takahashi et al. ............... 250/327.2

Primary Examiner—James R. Hoffman
Attorney, Agent, or Firm—Gerald J. Ferguson, Jr.; Michael P. Hoffman; James E. Bryan

[57] ABSTRACT

A radiation image storage panel comprising a support and at least one phosphor layer provided thereon which comprises a binder and a stimulable phosphor dispersed therein, wherein the support is a resin film containing a white pigment.

14 Claims, 3 Drawing Figures

RADIATION IMAGE STORAGE PANEL

BACKGROUND OF THE INVENTION

1. Field of the Invention

This invention relates to a radiation image storage panel, and more particularly, to a radiation image storage panel comprising a support and at least one phosphor layer provided thereon which comprises a binder and a stimulable phosphor dispersed therein.

2. Description of the Prior Art

For obtaining a radiation image, there has been conventionally employed a radiography utilizing a combination of a radiographic film having an emulsion layer containing a photosensitive silver salt material and a radiographic intensifying screen.

As a method replacing the above-described radiography, a radiation image recording and reproducing method utilizing a stimulable phosphor as described, for instance, in U.S. Pat. No. 4,239,968, has been recently paid much attention. In the radiation image recording and reproducing method, a radiation image storage panel comprising a stimulable phosphor (stimulable phosphor sheet) is used, and the method involves steps of causing the stimulable phosphor of the panel to absorb radiation energy having passed through an object or having been radiated by an object; exciting the stimulable phosphor with an electromagnetic wave such as visible light and infrared rays (hereinafter referred to as "stimulating rays") to sequentially release the radiation energy stored in the stimulable phosphor as light emission; photo-electrically processing the emitted light to give an electric singnal; and reproducing the electric signal as a visible image on a recording material such as a radiographic film or on a recording apparatus such as CRT.

In the above-described radiation image recording and reproducing method, a radiation image can be obtained with a sufficient amount of information by applying a radiation to the object at considerably smaller dose, as compared with the case of using the conventional radiography. Accordingly, this radiation image recording and reproducing method is of great value especially when the method is used for medical diagnosis.

The radiation image storage panel employed in the above-described radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock.

The phosphor layer comprises a binder and stimulable phosphor particles dispersed therein. When excited with stimulating rays after having been exposed to a radiation such as X-rays, the stimulable phosphor particles emit light (stimulated emission). Accordingly, the radiation having passed through an object or having been radiated by an object is absorbed by the phosphor layer of the radiation image storage panel in proportion to the applied radiation dose, and a radiation image of the object is produced in the radiation image storage panel in the form of a radiation energy-stored image (latent image). The radiation energy-stored image can be released as stimulated emission (light emission) by applying stimulating rays to the panel. The stimulated emission is then photo-electrically processed to convert to electric signals, so as to produce a visible image from the radiation energy-stored image.

It is desired for the radiation image storage panel employed in the radiation image recording and reproducing method to have a high sensitivity and to provide an image of high quality (sharpness, graininess, etc.).

For enhancement of the sensitivity of a radiation image storage panel, it has been known to provide a light-reflecting layer between a support and a phosphor layer of the panel. For instance, the light-reflecting layer is provided by vapor-deposition of a metal such as aluminum, lamination of a metal foil such as an aluminum foil, or coating of a binder solution containing a white powder such as titanium dioxide.

SUMMARY OF THE INVENTION

An object of the present invention is to provide a radiation image storage panel which is improved in the sensitivity.

In other words, an object of the invention is to provide a radiation image storage panel which is improved in the sharpness of the image provided thereby as compared with the sharpness of a conventional radiation image storage panel, provided that the comparison of the sharpness is made at the same sensitivity level basis.

There is provided by the present invention a radiation image storage panel comprising a support and at least one phosphor layer provided thereon which comprises a binder and a phosphor dispersed therein, wherein the support is a resin film containing a white pigment.

According to the present invention, a radiation image storage panel is prominently improved in the sensitivity by employing a resin film containing a white pigment as a support thereof.

When a radiation such as X-rays having passed through an object enters a phosphor layer of a radiation image storage panel, phosphor particles contained in the phosphor layer absorb the radiation energy to record on the phosphor layer a radiation energy-stored image corresponding to the radiation energy having passed through the object. Then, when an electromagnetic wave (stimulating rays) such as visible light and infrared rays is impinged upon the radiation image storage panel, a phosphor particle having received the stimulating rays immediately emits light in the near ultraviolet region. Since thus emitted light (of stimulated emission) does not have a specifically directive property, it advances in all directions and a part of the light enters directly a photosensor such as a photomultiplier moving close to the surface of the panel in which the light is then converted to electric signals. Thus, the radiation energy-stored image in the panel is reproduced, for example, as a visible image.

Another part of the light advances toward the interface between the phosphor layer and the support (in the opposite direction of the photosensor), and the light other than absorbed by or passing through the support is reflected by the support to enter the photosensor and to be converted to electric signals therein. Accordingly, the light to be converted to the electric signals by the photosensor is the sum of the light entering directly thereinto and the light entering there after reflected by the support.

In the case of a radiation image storage panel having no light-reflecting layer between the support and the phosphor layer, most of the light advancing toward the interface therebetween is absorbed by the support to vanish, or passes through the support to be scattered away, resulting in extreme decrease of the sensitivity of the panel.

As a result of the study of the present inventor, it has been discovered that the decrease of the sensitivity of the radiation image storage panel caused by vanishment of the light (which is emitted by the phosphor particles and advances toward the interface between the support and the phosphor layer) before converted to the electric signals, that is, caused by absorption by and/or transmission through the support, can be effectively prevented by using a resin film containing a powdery white pigment as the support thereof.

The phenomenon that the light emitted by the phosphor particles is absorbed by and/or passes through the support can be prevented by provision of the light-reflective support as described above, while the provision of the light-reflective support brings about adverse influence to the stimulating rays. That is, when a part of the stimulating rays pass through the phosphor layer without stimulating the phosphor particles therein and reach the light-reflective support, the stimulating rays are reflected by the support to spread widely within the phosphor layer. As the result, both the target phosphor particles and the phosphor particles present outside thereof are stimulated, and it causes decrease of the sharpness of the resulting image (which is obtained by converting the light emitted by these phosphor particles to the electric signals and reproducing therefrom).

In order to improve the image quality, particularly the sharpness of the image, Japanese Patent Provisional Publication No. 55(1980)-163500 (corresponding to U.S. Pat. No. 4,394,581 and European Patent Publication No. 21174) discloses the radiation image storage panel, at least a part of which is colored with a colorant.

As a result of further study of the present inventor, it has been also discovered that the sensitivity of the radiation image storage panel is improved without lowering the sharpness of the image provided thereby, by providing, between the phosphor layer and the support of a resin film containing a white pigment, a colored intermediate layer selectively absorbing the stimulating rays.

Accordingly, there is also provided by the present invention a radiation image storage panel comprising a support of a resin film containing a white pigment, at least one phosphor layer and a colored intermediate layer provided therebetween, wherein the intermediate layer is so colored that the mean absorption coefficient of said intermediate layer in the wavelength region of the stimulating rays for the stimulable phosphor is higher than the mean absorption coefficient of said intermediate layer in the wavelength region of the light emitted by the stimulable phosphor upon stimulation thereof. In the present specification, the term "absorption coefficient" means a ratio of abosorbed light to impinged light.

The radiation image storage panel of the present invention, as described above, is improved in the sensitivity. In other words, it is possible to improve the sharpness of the image provided thereby as compared with the conventional radiation image storage panel, as far as the the sharpness is determined at the same sensitivity level basis, because the thickness of the phosphor layer of the panel of the invention can be decreased if the sensitivity is set to the same level as the conventional panel. The radiation image storage panel of the invention can be further improved in the sharpness of the image at the same sensitivity level basis by providing the colored intermediate layer between the support and the phosphor layer.

Further, it has been noted that in the provision of the light-reflecting layer between the support and the phosphor layer by the conventionally employed coating procedure, there arises a problem that flexibility and mechanical strength of the resulting radiation image storage panel are lowered, because the coated light-reflecting layer is necessarily formed in a relatively large thickness to impart a high reflectivity and further an adhesive layer is necessarily provided thereon to compensate the poor adhesion of the surface of the light-reflective layer. However, it has been discovered that such a problem is not observed in the radiation image storage panel of the present invention, and the panel shows high flexibility and sufficient mechanical strength for employment in repeated use for an extended period.

Figure 1:
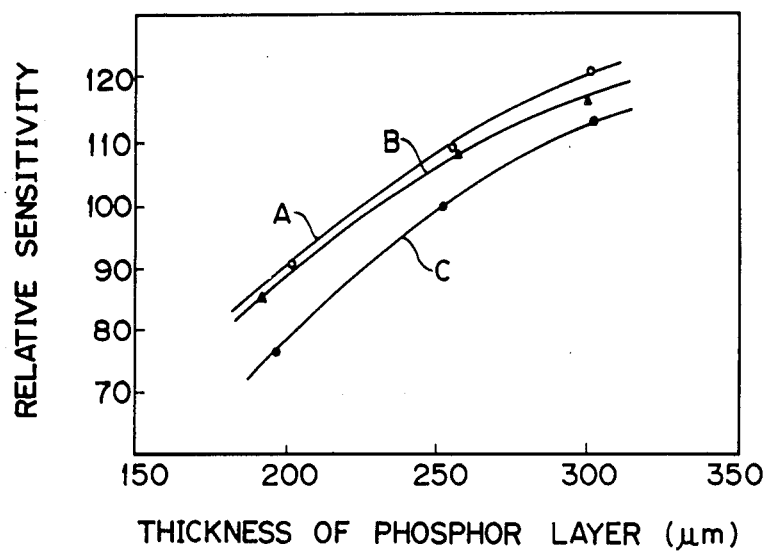
FIG. 1 shows relationships between a thickness of a phosphor layer and a relative sensitivity in a variety of radiation image storage panels employing different support materials.

Curve A: The radiation image storage panel in which the support is a resin film containing a white pigment.

Curve B: The radiation image storage panel in which the support is a resin film containing a white pigment and the colored intermediate layer is provided between the support and the phosphor layer.

Curve C: The radiation image storage panel in which the support is a resin film containing a light-absorbing material (carbon).

DETAILED DESCRIPTION OF THE INVENTION

The radiation image storage panel of the present invention can be prepared, for instance, in the manner as described below.

Examples of the resin employable for the support material of the radiation image storage panel of the invention include transparent resins such as cellulose acetate, polyester, polyethylene terephthalate, polyamide, polyimide, triacetate and polycarbonate. From the viewpoint of the constitution of the support defined in the present invention, as well as from the viewpoint of characteristics of the radiation image storage panel prepared therefrom as an information recording material, particularly preferred resin is polyethylene terephthalate.

The support in the panel of the invention can be prepared by incorporating a powdery white pigment into the resin and subsequently forming therefrom film containing the white pigment.

Examples of the white pigment preferably employable in the invention include $TiO_2$ (anatase-type, rutile-type), MgO, $2PbCO_3.Pb(OH)_2$, $BaSO_4$, $Al_2O_3$, BaFX (in which X is Cl or Br), $CaCO_3$, ZnO, $Sb_2O_3$, $SiO_2$, lithopone ($BaSO_4+ZnS$), magnesium silicate, basic lead silicosulfate, basic lead phosphate, and aluminum silicate. These white pigments have particularly high covering power and show high refractive index, so that they can satisfactorily scatter the light through reflection or refraction, and accordingly the sensitivity of the resultant radiation image storage panel is prominently improved.

Among the above-described white pigments, $TiO_2$ is preferred, because it can be sufficiently included in a resin and it shows high covering power. In other aspects, in the case that a phosphor employed in the radiation image storage panel is a stimulable phosphor which emits light in the near ultraviolet region as well as in the visible region such as a divalent europium activated alkaline earth metal fluorohalide phosphor and a cerium activated rare earth oxyhalide phosphor, anatase-type $TiO_2$, MgO, $2PbCO_3.Pb(OH)_2$, $BaSO_4$, $Al_2O_3$, and BaFX (in which X is Cl or Br) are preferred, because they show the reflection spectra in the near ultraviolet to visible wavelength regions. Accordingly, anatase-type $TiO_2$ is most preferable in the case of employing the stimulable phosphor which emits light in both the near ultraviolet and the visible region.

The thickness of the support prepared in the manner as mentioned above preferably ranges from 100 to 500 μm.

The above-mentioned white pigment is preferably contained in the support in an amount ranging from 5 to 500 mg./cm³ based on the volume of the support, and an amount from 25 to 250 mg./cm³ is more preferred.

In the radiation image storage panel of the present invention, a part of the light which is emitted by phosphor particles contained in the phosphor layer advances toward the interface between the support and the phosphor layer and is reflected by the white pigment particles contained in the support. As a result, most of the light is turned back to pass through the phosphor layer and then enters the photosensor. Accordingly, the sensitivity of the panel is prominently enhanced.

Further, the process for the preparation of the radiation image storage panel of the invention employing the above-mentioned support does not necessarily involve a procedure for forming a light-reflecting layer such as a coating procedure, which is generally required in the preparation of the conventional high sensitive panel. Furthermore, the present invention can solve problems such as the decrease of flexibility and mechanical strength of the panel in the conventional high sensitive panel arising from the provision of a light-reflecting layer. Moreover, the present invention makes it possible to easily control the flexibility of the resultant panel by using a suitable binder in the coating dispersion for formation of the phosphor layer.

An adhesive layer may be provided on the support by coating an adhesive agent over the surface of the support on the phosphor layer side, to enhance the bonding force between the support and the phosphor layer.

On the surface of the support containing the white pigment is then provided a phosphor layer. The phosphor layer comprises a binder and stimulable phosphor particles dispersed therein.

The stimulable phosphor particles, as described hereinbefore, give stimulated emission when excited by stimulating rays after exposure to a radiation. In the viewpoint of practical use, the stimulable phosphor is desired to give stimulated emission in the wavelength region of 300–500 nm when excited by stimulating rays in the wavelength region of 400–850 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO.xAl_2O_3$:Eu, in which x is a number satisfying the condition of $0.8 \leq x \leq 10$, and $M^{2+}O \cdot xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,236,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leq 0.6$, and $xy=0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078; and $(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Cy, Pr, Ho, Nd, Yb and Er, and x and y are numbers satisfying the conditions of $0 \leq x \leq 0.6$ and $0 \leq y \leq 0.2$, respectively, as described in Japanese Patent Provisional Publication No. 55(1980)-12145.

The above-mentioned stimulable phosphor are given by no means to restrict the stimulable phosphor employable in the present invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the support, for instance, by the following procedure.

In the first place, phosphor particles and a binder are added to an appropriate solvent, and then, they are mixed to prepare a coating dispersion of the phosphor particles dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethylether; and mixtures of the above-mentioned compounds.

The ratio between the binder and the phosphor particles in the coating dispersion may be determined according to the characteristics of the aimed radiation image storage panel and nature of the stimulable phosphor employed. Generally, the ratio therebetween is with the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene gylcols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of the support to form a layer of the coating dispersion. The coating procedure can be carried out by a conventional method such as a method using a doctor blade, a roll coater or a knife coater.

After applying the coating dispersion to the support, the coating dispersion is then heated slowly to dryness, so as to complete the formation of a phosphor layer. The thickness of the phosphor layer varies depending upon the characteristics of the aimed radiation image storage panel, nature of the phosphor, the ratio between the binder and the phosphor particles, etc. Generally, the thickness of the phosphor layer is within the range of from 20 $\mu$m to 1 mm, preferably from 50 to 500 $\mu$m.

The phosphor layer can be provided onto the support by the methods other than that given in the above. For instance, the phosphor layer is initially prepared on a sheet material such as a glass plate, metal plate or plastic sheet using the aforementioned coating dispersion and then the so prepared phosphor layer is overlaid on the support by pressing or by using an adhesive agent.

From the viewpoint of the sharpness of the image, as described above, it is desired that a colored intermediate layer is provided between the above-mentioned support and the phosphor layer in the radiation image storage panel of the invention. The colored intermediate layer is, for example, prepared from a binder colored with such a colorant as selectively absorbing the stimulating rays to be applied to the panel.

The colorant employable in the radiation image storage panel of the present invention has the reflective characteristics (absorptive characteristics) that the mean absorption coefficient thereof in the wavelength region of the stimulating rays for the stimulable phosphor contained in the panel is higher than the mean absorption coefficient thereof in the wavelength region of the light emitted by the stimulable phosphor upon stimulation. From the viewpoint of the sharpness of the image provided by the radiation image storage panel, it is desired that the mean absorption coefficient thereof in the wavelength region of the stimulating rays for the stimulable phosphor is as high as possible. On the other hand, from the viewpoint of the sensitivity of the panel, it is desired that the mean absorption coefficient thereof in the wavelength region of the light emitted by the stimulable phosphor upon stimulation thereof is as low as possible.

Accordingly, the preferred colorant depends on the stimulable phosphor employed in the radiation image storage panel. In the viewpoint of practical use, the stimulable phosphor is desired to give stimulated emission in the wavelength region of 300–500 nm when excited by stimulating rays in the wavelength region of 400–850 nm as described above. Employable for such a stimulable phosphor is a colorant having a body color ranging from blue to green so that the mean absorption coefficient thereof in the wavelength region of the stimulating rays for the phosphor is higher than the mean absorption coefficient thereof in the wavelength region of the light emitted by the phosphor upon stimulation and that the difference therebetween is as large as possible.

Examples of the colorant employed in the invention include the colorants disclosed in the aforementioned Japanese Patent Provisional Publication No. 55(1980)-163500, that is: organic colorants such as Zapon Fast Blue 3G (available from H<echst AG), Estrol Brill Blue N-3RL (available from Sumitomo Cheimcal Co., Ltd., Japan), Sumiacryl Blue F-GSL (available from Sumitomo Chemical Co., Ltd.), D & C Blue No.1 (available from National Aniline), Spirit Blue (available from Hodogaya Chemical Co., Ltd., Japan), Oil Blue No.603 (available from Orient Co., Ltd.), Kiton Blue A (available from Ciba-Geigy), Aizen Cathilon Blue GLH (available from Hodogaya Chemical Co., Ltd.), Lake Blue A.F.H. (available from Kyowa Sangyo Co., Ltd., Japan), Rodaline Blue 6GX (available from Kyowa Sangyo Co., Ltd.), Primocyanine 6GX (available from Inahata Sangyo Co., Ltd., Japan), Brillacid Green 6BH (available from Hodogaya Chemical Co., Ltc.), Cyanine Blue BNRS (available from Toyo Ink Mfg. Co., Ltd., Japan), Lionol Blue SL (available from Toyo Ink Mfg. Co., Ltd.), and the like; and inorganic colorants such as ultramarine blue, cobalt blue, ceruleanblue, chromium oxide, $TiO_2$-ZnO-CoO-NiO pigment, and the like.

Examples of the colorant employable in the present invention also include the colorants described in the Japanese Patent Application No. 55(1980)-171545 filed by the assignee of the present application, that is: organic metal complex salt colorants having Color Index No. 24411, No. 23160, No. 74180, No. 74200, No. 22800, No. 23150, No. 23155, No. 24401, No. 14880, No. 15050, No. 15706, No. 15707, No. 17941, No. 74220, No. 13425, No. 13361, No. 13420, No. 11836, No. 74140, No. 74380, No. 74350, No. 74460, and the like.

Among the above-mentioned colorants having a body color from blue to green, particularly preferred are the organic metal complex salt colorants which show no emission in the longer wavelength region than that of the stimulating rays as described in the latter Japanese Patent Application No. 55-(1980)-171545.

Examples of a binder of the colored intermediate layer include the binders exemplified for the formation of the phosphor layer.

The colored intermediate layer can be formed on the support by the following procedure.

The above-mentioned colorant and binder are added to an appropriate solvent, and they are mixed to prepare a coating dispersion of the colorant dispersed in the binder solution. As for the solvent, the aforementioned solvents exemplified for the formation of the phosphor layer can be employed.

The prepared coating dispersion is applied evenly to the surface of the support to form a layer of the coating dispersion. Then, the coating dispersion is heated slowly to dryness so as to complete the formation of an colored intermediate layer.

The colored intermediate layer can be provided onto the support by the methods other than that given in the above. For instance, the colored film prepared beforehand can be placed and fixed onto the support with an appropriate adhesive agent to provide the colored intermediate layer.

The radiation image storage panels generally have a transparent film on the free surface of the phosphor layer to protect the phosphor layer from physical and chemical deterioration. In the panel of the present invention, it is preferably to include a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate or vinyl chloride-vinyl acetate copolymer), and drying the coated solution. Alternatively, the transparent film can be provided onto the phosphor layer by beforehand preparing from a polymer such as polyethylene terephthalate, polyethylene, polyvinylidene chloride or polyamide, following by placing and fixing onto the support with an appropriate adhesive agent to provide the protective film. The transparent protective film preferably has a thickness within the range of approximately 3 to 20 $\mu$m.

The following examples will further illustrate the present invention, which are by no means intended to restrict the invention.

EXAMPLE 1

As a support, a polyethylene terephthalate film (thickness: 188 $\mu$m) containing powdery titanium dioxide (anatase-type) in the amount of 120 mg./cm$^3$ based on the volume of the support was prepared.

A dispersion containing a divalent europium activated barium fluorobromide (BaFBr:Eu$^{2+}$) phosphor particles, a linear polyester resin and a nitrocellulose (nitrofication degree: 11.5%) was prepared by adding metyl ethyl ketone and the nitrocellulose to a mixture of the phosphor particles and the polyester resin under stirring. To the phosphor dispersion were added tricresyl phosphate, n-butanol and methyl ethyl ketone. The mixture was sufficiently stirred by means of a propeller agitator to obtain a homogeneous coating dispersion in the mixture ratio of 1:20 (the binder:the phosphor) by weight and having a viscosity of 25-35 PS (at 25° C.).

The coating dispersion was evenly applied to the support placed horizontally on a glass plate. The coating procedure was carried out using a doctor blade. The support carrying the coating dispersion was placed in an over and heated at a temperature gradually rising from 25° to 100° C. Thus, a phosphor layer having a thickness of approximately 200 $\mu$m was formed on the support.

On the phosphor layer of the support was placed a transparent polyethylene terephthalate film (thickness: 12 $\mu$m; provided with a polyester adhesive layer) to laminate the transparent film thereon.

Thus, a radiation image storage panel consisting essentially of a support, a phosphor layer and a transparent protective film was prepared.

Further, by varying the thickness of the phosphor layer within the range of 150–350 $\mu$m, a variety of radiation image storage panels consisting essentially of the support containing anatase-type titanium dioxide, a phosphor layer having the different thickness and the transparent protective film were prepared. The prepared panels were named Panels A.

EXAMPLE 2

On the same support as prepared in Example 1, a coating dispersion prepared by dispersing an organic metal complex salt blue colorant (Bari Fast Blue 1605; manufactured by Orient Co., Ltd.) and hardening agent in an aqueous gelatin in the ratio of 1:2×10$^3$ (colorant:binder) was coated to form a colored intermediate layer (thickness: 25 $\mu$m) thereon.

A variety of radiation image storage panels consisting essentially of the support containing anatase-type titanium dioxide, a phosphor layer having a different thickness and the transparent protective film were prepared in the same manner as mentioned in Example 1 except for providing the phosphor layer onto the so formed colored intermediate layer of the support. The prepared panels were named Panels B.

COMPARISON EXAMPLE 1

As a support, a polyethylene terephthalate film (thickness: 188 $\mu$m) containing carbon powder (light-absorbing material) was prepared.

A variety of radiation image storage panels consisting essentially of the support containing carbon, a phosphor layer having a different thickness and the transparent protective film were prepared in the same manner as mentioned in Example 1 except for using the so prepared support. The prepared panels were named Panels C.

The radiation image storage panels (Panels A through Panels C) prepared as above were evaluated on the sensitivity and the sharpness of the image. The evaluation methods are given below.

(1) Sensitivity

The radiation image storage panel was exposed to X-rays of 80 KVp and subsequently excited with a He-Ne laser (wavelength: 632.8 nm), to measure the sensitivity thereof.

(2) Sharpness of Image

The radiation image storage panel was exposed to X-rays of 80 KVp through an MTF chart and subsequently was scanned with a He-Ne laser beam (wavelength: 632.8 nm) to stimulate the phosphor particles. The light emitted by the phosphor layer of the panel was detected and converted to the corresponding electric signals by means of a photosensor (a photomultiplier having spectral sensitivity of type S-5). The electric signals were reproduced by an image reproducing apparatus to obtain a visible image on a recording apparatus, and the modulation transfer function (MTF) value of the visible image was determined. The MTF value was given as a value (%) at the spacial frequency of 2 cycle/mm.

Figure 2:
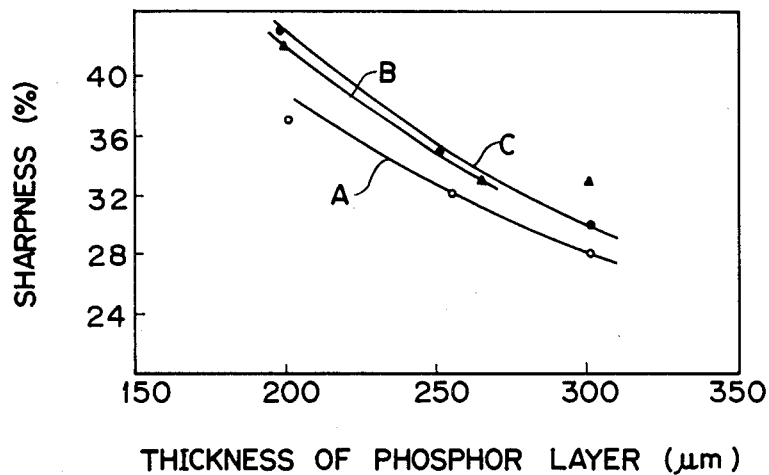
FIG. 2 shows relationships between a thickness of a phosphor layer and a sharpness of the image in the same radiation image storage panels as in FIG. 1.
Figure 3:
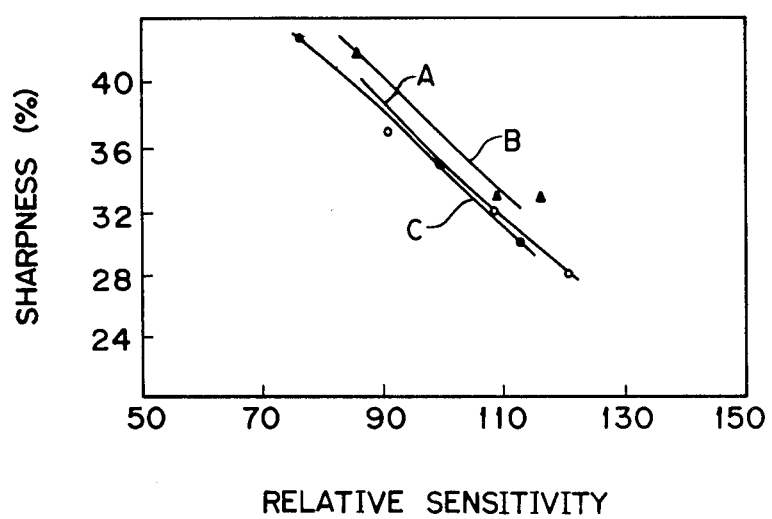
FIG. 3 shows relationships between a relative sensitivity and a sharpness of the image in the same radiation image storage panels as in FIG. 1.

The results on the evaluation of Panels A through Panels C are graphically set forth in FIG. 1 through FIG. 3.

In FIG. 1,

Curve A shows a relationship between a thickness of the phosphor layer and a relative sensitivity with respect to Panels A in which the support is a polyethylene terephthalate film containing an anatase-type titanium dioxide;

Curve B shows a relationship between a thickness of the phosphor layer and a relative sensitivity with respect to Panels B in which the support is a polyethylene terephthalate film containing anatase-type titanium dioxide and a colored intermediate layer is provided between the support and the phosphor layer; and, Curve C shows a relationship between a thickness of the phosphor layer and the relative sensitivity with respect to Panels C in which the support is a polyethylene terephthalate film containing carbon.

In FIG. 2,

Curve A shows a relationship between a thickness of the phosphor layer and a sharpness with respect to Panels A in which the support is a polyethylene terephthalate film containing an anatase-type titanium dioxide;

Curve B shows a relationship between a thickness of the phosphor layer and a sharpness with respect to Panels B in which the support is a polyethylene terephthalate film containing anatase-type titanium dioxide and a colored intermediate layer is provided between the support and the phosphor layer; and Curve C shows a relationship between a thickness of the phosphor layer and the sharpness with respect to Panels C in which the support is a polyethylene terephthalate film containing carbon.

FIG. 3 illustrates a graph prepared by combining the data given in FIG. 1 and the data given in FIG. 2.

In FIG. 3,

Curve A shows a relationship between a relative sensitivity and a sharpness with respect to Panels A in which the support is a polyethylene terephthalate film containing an anatase-type titanium dioxide;

Curve B shows a relationship between a relative sensitivity and a sharpness with respect to Panels B in which the support is a polyethylene terephthalate film containing anatase-type titanium dioxide and a colored intermediate layer is provided between the support and the phosphor layer; and, Curve C shows a relationship between a relative sensitivity and the sharpness with respect to Panels C in which the support is a polyethylene terephthalate film containing carbon.

As is evident from the results set forth in FIG. 1, the sensitivity of the radiation image storage panel is effectively improved in the case of using the support containing titanium dioxide either in the presence or absence of the colored intermediate layer, as compared with the case of using the support containing carbon.

As is evident from the results set forth in FIG. 2, the sharpness of the radiation image storage panel is somewhat lowered in the case of using the support containing titanium dioxide and not having the colored intermediate layer, but is little lowered in the case of using that support and having the colored intermediate layer, as compared with the case of using the support containing carbon (for improvement in the sharpness).

As is evident from the results set forth in FIG. 3, the sharpness of the radiation image storage panel is effectively improved in the case of using the support containing titanium dioxide, as compared with the case of using the support containing carbon, when the comparison is made at the same sensitivity level basis. Further evident is the sharpness of the panel is highly improved in the case of using the support containing titanium dioxide and having the colored intermediate layer, as compared with the case of using the support containing carbon, when the comparison is made at the same sensitivity level basis.

What is claimed is:

1. A radiation image storage panel comprising a support and at least one phosphor layer provided thereon which comprises a binder and a stimulable phosphor dispersed therein, said panel, in use, being subjected to a radiation having passed through an object or having radiated from an object to cause said stimulable phosphor to absorb said radiation, followed by exciting said stimulable phosphor with an electromagnetic wave to release radiation stored in said stimulable phosphor as emitted light, and detecting said emitted light, wherein the support is a resin film containing anatase-type titanium dioxide.

2. The radiation image storage panel as claimed in claim 1, in which the anatase-type titanium dioxide is contained in the support in an amount ranging from 5 to 500 mg./cm$^3$ based on the volume of the support.

3. The radiation image storage panel as claimed in claim 2, in which the anatase-type titanium dioxide is contained in the support in the amount ranging from 25 to 250 mg./$^3$ based on the volume of the support.

4. The radiation image storage panel as claimed in claim 1, 2 or 3, in which the support is a polyethylene terephthalate film containing anatase-type titanium dioxide.

5. The radiation image storage panel as claimed in claim 1, in which the stimulable phosphor emits light in both the near ultraviolet wavelength region and the visible wavelength region.

6. The radiation image storage panel as claimed in claim 5, in which stimulable phosphor is a divalent europium activated alkaline earth metal fluorohalide phosphor.

7. The radiation image storage panel as claimed in claim 5, in which the stimulable phosphor is a cerium activated rare earth oxyhalide phosphor.

8. A radiation image storage panel comprising a support and at least one phosphor layer provided thereon which comprises a binder and a stimulable phosphor dispersed therein, said panel, in use, being subjected to a radiation having passed through an object or having radiated from an object to cause said stimulable phosphor to absorb said radiation, followed by exciting said stimulable phosphor with a stimulating ray of electromagnetic wave to release radiation stored in said stimulable phosphor as emitted light, and detecting said emitted light, wherein the support is a resin film containing a white pigment; and a colored intermediate layer is provided between the support and the phosphor layer, the intermediate layer being so colored that the mean absorption coefficient of said intermediate layer in the wavelength region of the stimulating rays is higher than the mean absorption coefficient of said intermediate layer in the wavelength region of the light emitted by the stimulable phosphor upon stimulation thereof.

9. The radiation image storage panel as claimed in claim 8, in which the white pigment is contained in the support in an amount ranging from 5 to 500 mg./cm$^3$ based on the volume of the support.

10. The radiation image storage panel as claimed in claim 9, in which the white pigment is contained in the support in amount ranging from 25 to 250 mg./cm$^3$ based on the volume of the support.

11. The radiation image storage panel as claimed in claim 8, 9 or 10, in which the support is polyethylene terephthalate film containing a white pigment.

12. The radiation image storage panel as claimed in claim 8, in which said stimulable phosphor gives stimulated emission in the wavelength region of 300 to 500 nm when excited by the stimulating rays in the wavelength region of 400 to 850 nm, and said intermediate layer is colored with a colorant having a body color ranging from blue to green.

13. The radiation image storage panel as claimed in claim 12, in which the stimulable phosphor is a divalent europium activated alkaline earth metal fluorohalide phosphor.

14. The radiation image storage panel as claimed in claim 13, in which the stimulable phosphor is a cerium activated rare earth oxyhalide phosphor.

* * * * *